United States Patent
Smirnov et al.

(10) Patent No.: US 10,853,928 B2
(45) Date of Patent: Dec. 1, 2020

(54) IMAGE FUSION PROCESSING MODULE

(71) Applicant: Apple Inc., Cupertino, CA (US)

(72) Inventors: Maxim Smirnov, Wilsonville, OR (US); Elena Lamburn, San Jose, CA (US)

(73) Assignee: Apple Inc., Cupertino, CA (US)

(*) Notice: Subject to any disclaimer, the term of this patent is extended or adjusted under 35 U.S.C. 154(b) by 82 days.

(21) Appl. No.: 16/370,662

(22) Filed: Mar. 29, 2019

(65) Prior Publication Data

US 2020/0311890 A1   Oct. 1, 2020

(51) Int. Cl.
*G06T 5/50* (2006.01)
*H04N 5/235* (2006.01)
*G06T 5/00* (2006.01)

(52) U.S. Cl.
CPC ............ *G06T 5/50* (2013.01); *G06T 5/002* (2013.01); *H04N 5/2352* (2013.01); *H04N 5/2355* (2013.01); *H04N 5/2356* (2013.01); *G06T 2207/10024* (2013.01); *G06T 2207/10144* (2013.01); *G06T 2207/20208* (2013.01); *G06T 2207/20221* (2013.01)

(58) Field of Classification Search
CPC .................................. G06T 5/50; G06T 5/002
See application file for complete search history.

(56) References Cited

U.S. PATENT DOCUMENTS

| | | | |
|---|---|---|---|
| 8,873,883 B2 | 10/2014 | Zhang et al. | |
| 2012/0050474 A1* | 3/2012 | Segall | H04N 19/85 348/43 |
| 2012/0136373 A1 | 5/2012 | Tippett | |
| 2017/0237905 A1 | 8/2017 | Molgaard et al. | |

FOREIGN PATENT DOCUMENTS

| | | |
|---|---|---|
| CN | 102063712 B | 1/2013 |
| WO | WO 2018/136373 A1 | 7/2018 |

OTHER PUBLICATIONS

Mantiuk, R. et al., "High Dynamic Range Imaging," Wiley Encyclopedia of Electrical and Electronics Engineering, Apr. 18, 2016, 81 pages.

(Continued)

*Primary Examiner* — Tuan H Nguyen
(74) *Attorney, Agent, or Firm* — Fenwick & West LLP

(57) ABSTRACT

Embodiments relate to fusion processing between two images captured with two different exposure times to generate a fused image with a higher dynamic range. An unscaled single color version of a first image is blended with another unscaled single color version of a second image to generate an unscaled single color version of the fused image. A downscaled multi-color version of the first image is blended with a downscaled multi-color version of the second image to generate a downscaled multi-color version of the fused image of a plurality of downscaled versions of the fused image. A first downscaled multi-color version of the fused image is generated by upscaling and accumulating the plurality of downscaled versions of the fused image. The first downscaled multi-color version of the fused image has a pixel resolution lower than a pixel resolution of the unscaled single color version of the fused image.

20 Claims, 8 Drawing Sheets

(56) References Cited

OTHER PUBLICATIONS

Wang, C. et al., "A Multi-exposure Images Fusion Approach for Very Large Dynamic Range Scenes," International Journal of Signal Processing, Image Processing and Pattern Recognition, vol. 7, No. 5 (2014), pp. 217-228.
Burt, P. J. et al., "Enhanced Image Capture through Fusion," Proceedings of the Fourth International Conference on Computer Vision, May 1993, pp. 173-182.
Li, Z. et al., "Selectively Detail-Enhanced Fusion of Differently Exposed Images with Moving Objects," IEEE Transactions on Image Processing, vol. 23, No. 10, Oct. 2014, pp. 4372-4382.
PCT International Search Report and Written Opinion, PCT Application No. PCT/US2019/063059, dated Mar. 18, 2020, 18 pages.

* cited by examiner

IMAGE FUSION PROCESSING MODULE

BACKGROUND

1. Field of the Disclosure

The present disclosure relates a circuit for processing images and more specifically to fusing two images of different exposure times.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

SUMMARY

Embodiments relate to an image fusion processing circuitry. The image fusion processing circuitry includes an image fusion circuit and a multi-scale image fusion circuit. The image fusion circuit blends an unscaled single color version of a first image with another unscaled single color version of a second image to generate an unscaled single color version of a fused image, the first image and the second image capturing a same scene with different exposure times. The multi-scale image fusion circuit blends a downscaled multi-color version of the first image with a downscaled multi-color version of the second image to generate a downscaled multi-color version of the fused image of a plurality of downscaled versions of the fused image. The multi-scale image fusion circuit further generates a first downscaled version of the fused image by accumulating the plurality of downscaled versions of the fused image, the first downscaled version comprising a plurality of color components and having a pixel resolution lower than a pixel resolution of the unscaled single color version of the fused image.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to circuitry for performing fusion processing between two images captured with two different exposure times (e.g., long and short exposure images) to generate a fused image having a higher dynamic range than that of the captured images. An unscaled single color version of a first image is blended with another unscaled single color version of a second image to generate an unscaled single color version of the fused image. A downscaled multi-color version of the first image is blended with a downscaled multi-color version of the second image to generate a downscaled multi-color version of the fused image of multiple downscaled versions of the fused image. A first downscaled multi-color version of the fused image is generated by upscaling and summing the multiple downscaled versions of the fused image. The first downscaled multi-color version of the fused image has a pixel resolution lower than a pixel resolution of the unscaled single color version of the fused image.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
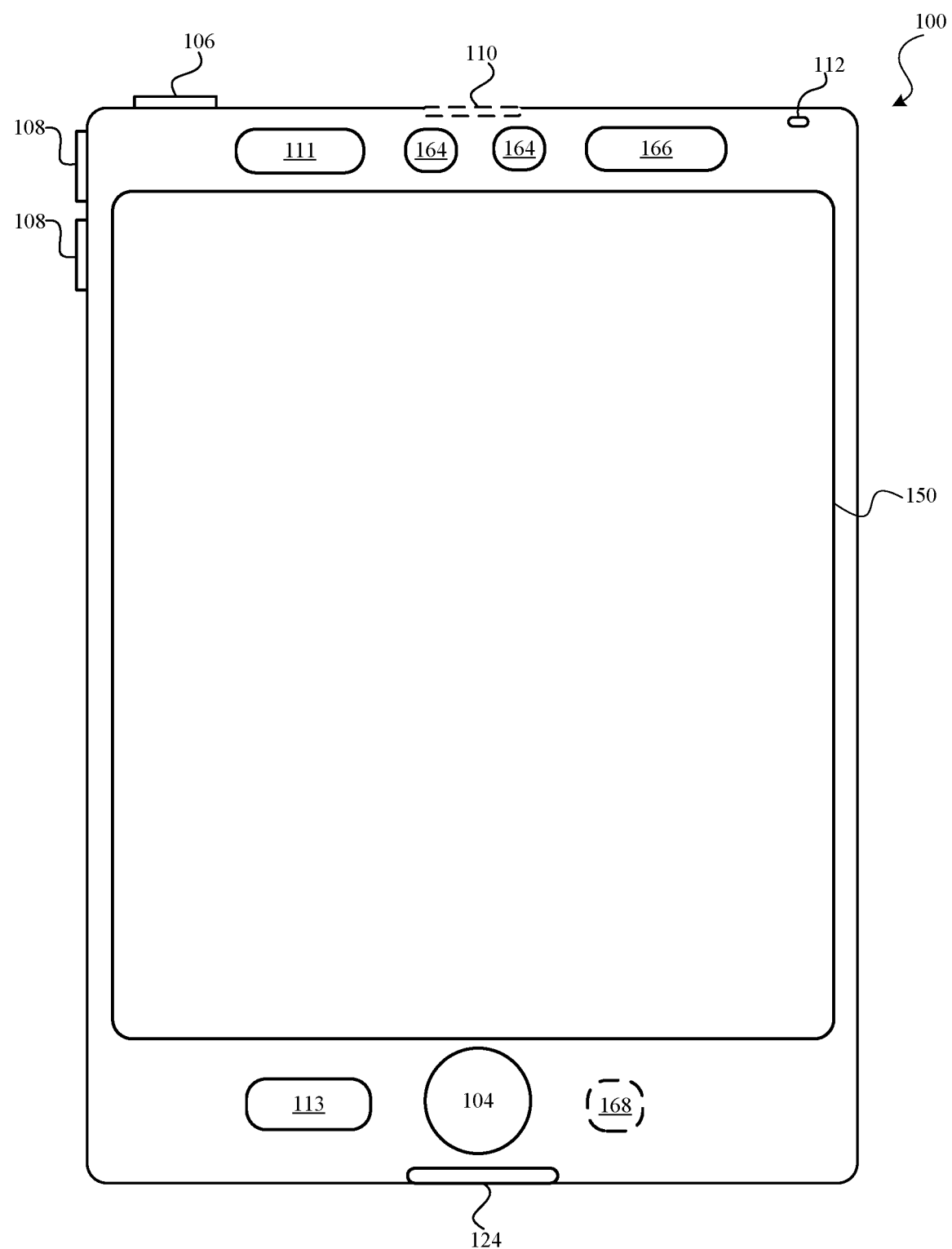
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
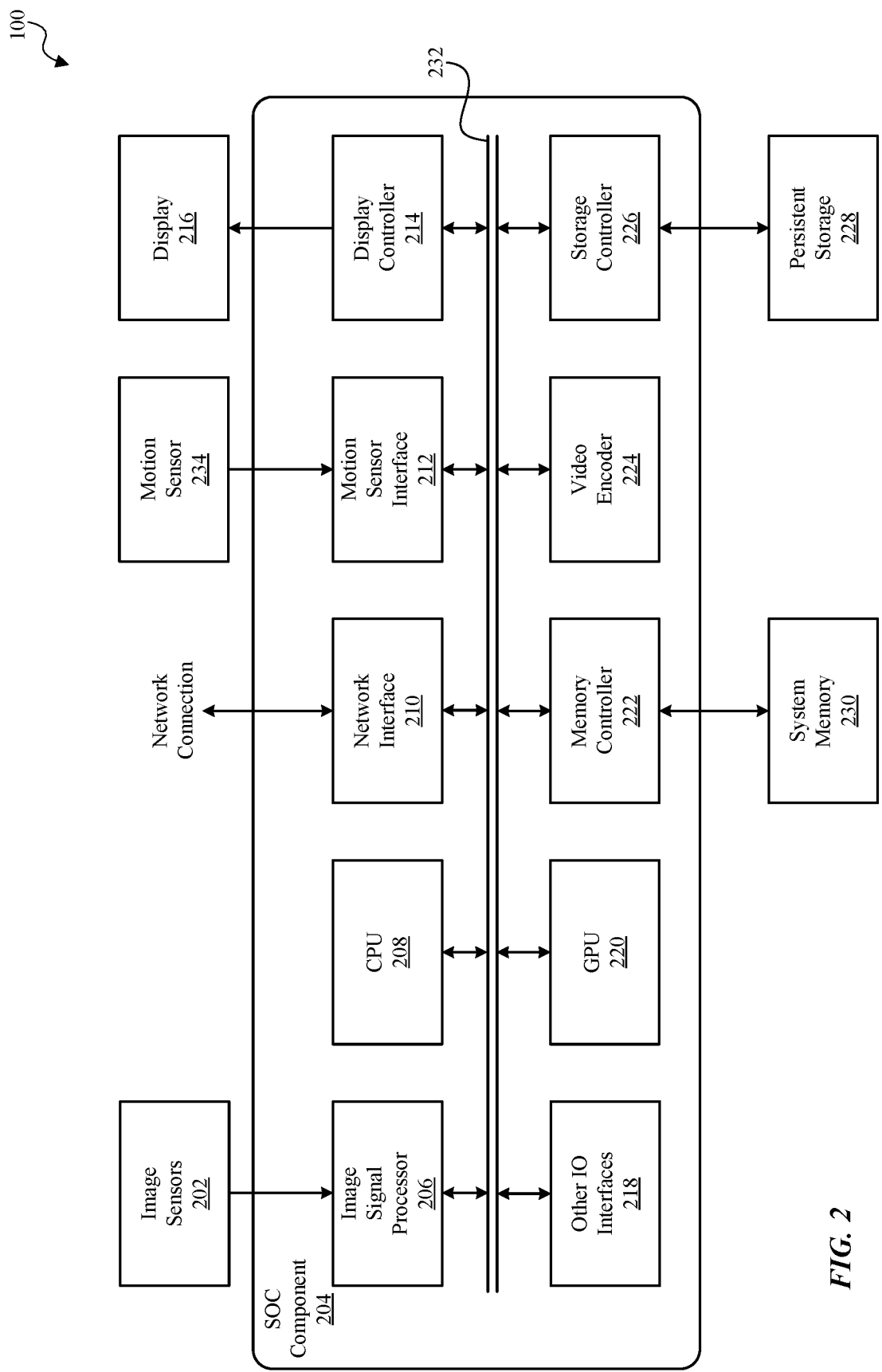
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
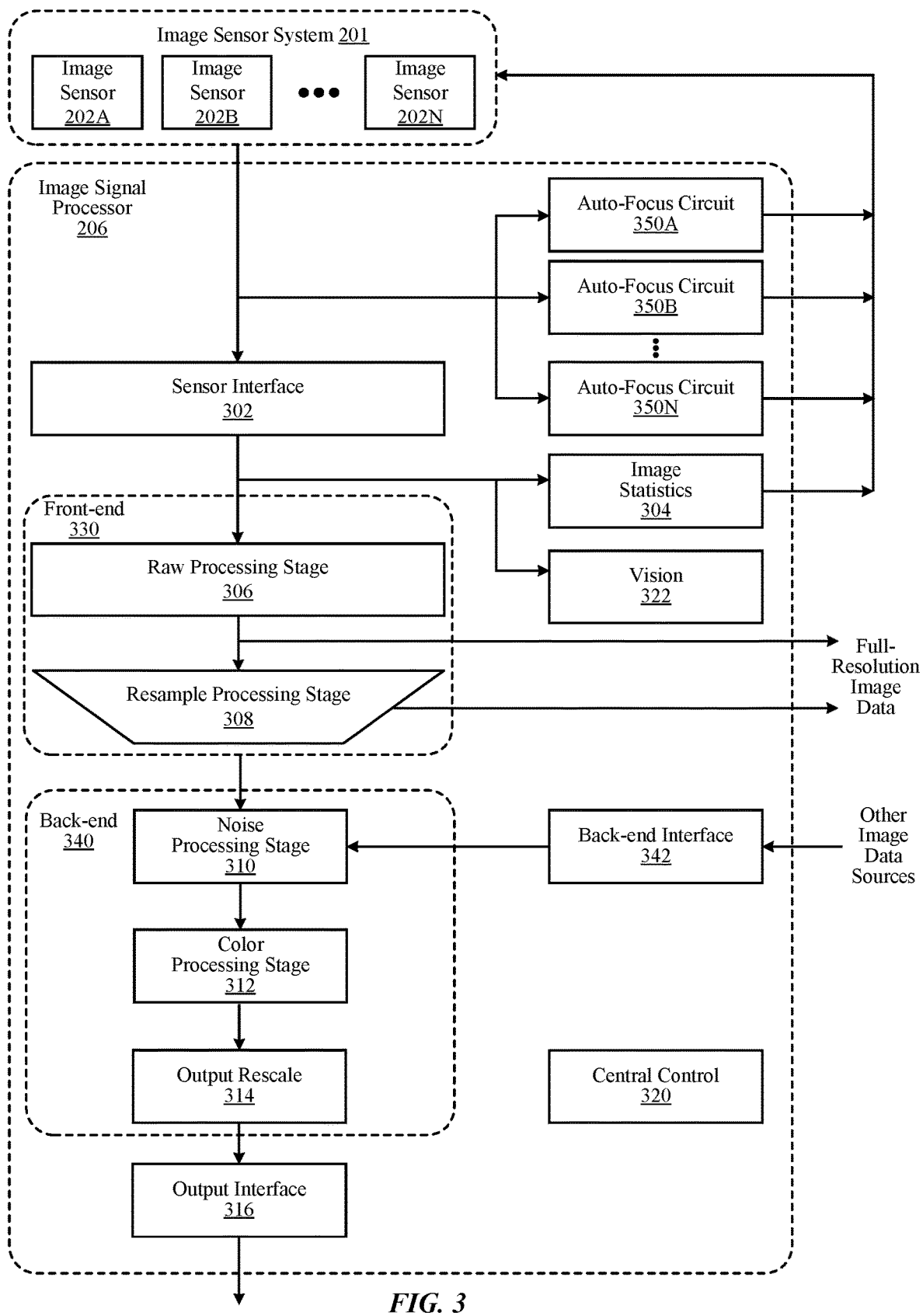
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness.

Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Pipelines for Image Fusion

Figure 4:
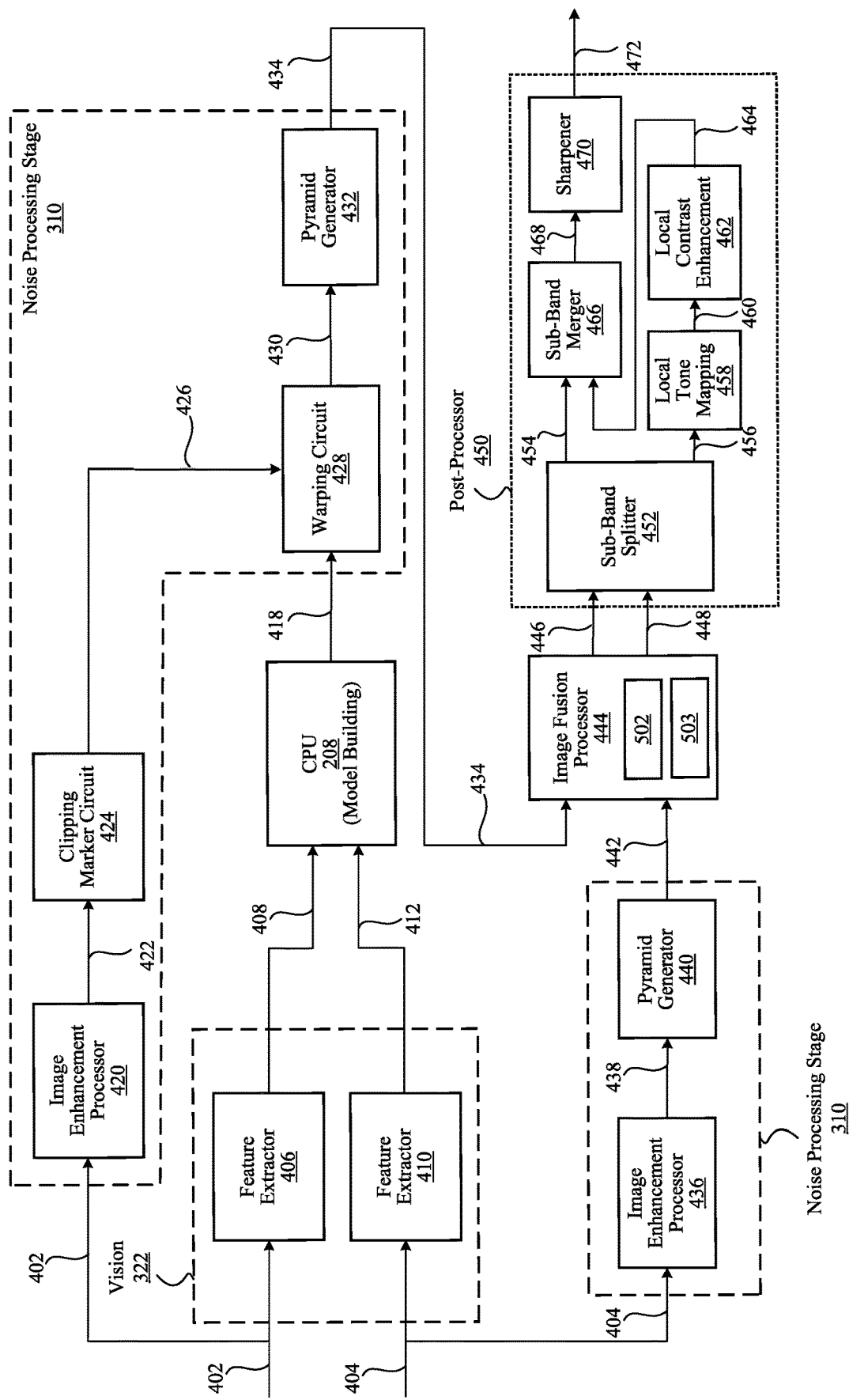
FIG. 4 is a block diagram illustrating a portion of the image processing pipeline including circuitry for image fusion, according to one embodiment.

FIG. 4 is a block diagram illustrating a portion of the image processing pipeline including circuitry for image fusion, according to one embodiment. Images 402, 404 are captured by image sensor system 201 and passed onto vision module 322. In one embodiment, image 402 is captured shortly before or after capturing image 404. Alternatively, images 402 and 404 are captured at the same time using two different image sensors 202 with different exposure times. Image 402 captures a scene with a first exposure time, and image 404 captures the same scene with a second exposure time that may be different than the first exposure time. If the second exposure time is shorter than the first exposure time, image 402 can be referred to as "long exposure image" and image 404 can be referred to as "short exposure image." Each image 402, 404 includes multiple color components, e.g., luma and chroma color components. Image 402 is passed onto feature extractor circuit 406 of vision module 322 for processing and feature extraction. Image 404 may be passed onto feature extractor circuit 410 of vision module 322 for processing and feature extraction. Alternatively, feature extractor circuit 410 may be turned off.

Feature extractor circuit 406 extracts first keypoint information 408 about first keypoints (e.g., salient points) in image 402 by processing pixel values of pixels in image 402. The first keypoints are related to certain distinguishable features (also referred to "salient points") in image 402. Extracted first keypoint information 408 can include information about spatial locations (e.g., coordinates) of at least a subset of pixels in image 402 associated with the first keypoints of image 402. For each of the first keypoints in image 402, feature extractor circuit 406 may also extract and encode a keypoint descriptor, which includes a keypoint scale and orientation information. Thus, first keypoint information 408 extracted by feature extractor circuit 406 may include information about a spatial location of each of the first keypoints of image 402 and a keypoint descriptor of each of the first keypoints of image 402. First keypoint information 408 associated with at least the subset of pixels of image 402 is passed onto CPU 208 for processing.

Feature extractor circuit 410 extracts second keypoint information 412 about second keypoints in image 404 by processing pixel values of pixels in image 404. The second keypoints are related to certain distinguishable features (e.g., salient points) in image 404. Extracted second keypoint information 412 can include information about spatial locations (e.g., coordinates) of at least a subset of pixels in image 404 associated with the second keypoints of image 404. For each of the second keypoints in image 404, feature extractor circuit 410 may also extract and encode a keypoint descriptor, which includes a keypoint scale and orientation information. Thus, second keypoint information 412 extracted by feature extractor circuit 410 may include information about a spatial location of each of the second keypoints of image 404 and a keypoint descriptor of each of the second keypoints of image 404. Second keypoint information 412 associated with at least the subset of pixels of image 404 are passed onto CPU 208 for processing. Alternatively (not shown in FIG. 4), feature extractor circuit 410 is turned off. In such case, second keypoints of image 404 are not extracted and only first keypoint information 408 is passed onto CPU 208 for processing.

CPU 208 builds a model describing correspondence between image 402 and image 404. CPU 208 searches for correspondences between first keypoint information 408 of image 402 and second keypoint information 412 of image 404 to generate at least one motion vector representing relative movement in image 402 and image 404. In one embodiment, CPU 208 correlates (matches) first keypoint information 408 with second keypoint information 412, e.g., by comparing and pairing keypoint descriptors extracted from images 402 and 404 to determine a set of keypoint information matches, such as pairs of keypoint descriptors extracted from images 402 and 404. CPU 208 then performs a model fitting algorithm by processing the determined set of keypoint information matches to build the model. The model fitting algorithm may be designed to discard false matches during the model building process. The model fitting algorithm may be based on, e.g., the iterative random sample consensus (RANSAC) algorithm. The model built by CPU 208 includes information about mapping between pixels in the images 402 and 404. The model may represent a linear, affine and perspective transformation. Alternatively, the model may be a non-linear transformation. Based on the model, warping parameters (mapping information) 418 may be generated by CPU 208 and sent to warping circuit 428 for spatial transformation of image 402 and/or image 404. Warping parameters 418 can be used in a form of a matrix for spatial transformation (e.g., warping) of image 402 and/or image 404. The matrix for spatial transformation represents a geometric transformation matrix or a mesh grid with motion vectors defined for every grid point. Alternatively, a dedicated circuit instead of CPU 208 may be provided to perform the RANSAC algorithm and to generate warping parameters 418.

In the embodiment when feature extractor circuit 410 is turned off and only first keypoint information 408 is passed onto CPU 208, CPU 208 generates a motion vector for each of the first keypoints of image 402. This is done by performing, e.g., the NCC search within an expected and configurable displacement range to determine a best feature match within a defined spatial vicinity (patch) of each first keypoint of image 402. In such case, CPU 208 performs a model fitting algorithm (e.g., the RANSAC algorithm) that uses first keypoint information 408 (e.g., coordinates of the first keypoints) and corresponding motion vectors determined based on feature matches to build a model, whereas matching of keypoints between images 402 and 404 is not performed. The model fitting algorithm may be designed to discard false feature matches. Based on the built model, CPU 208 generates warping parameters (mapping information) 418 that is sent to warping circuit 428 for spatial transformation of image 402. Alternatively, a dedicated circuit instead of CPU 208 may be provided to perform the NCC search and to generate a motion vector for each of the first keypoints of image 402. In such case, CPU 208 uses the motion vector for each of the first keypoints generated by the dedicated circuit to build the model.

Image 402, which may be a long exposure image, is also passed onto image enhancement processor 420 that performs certain processing of image 402, e.g., noise removal, enhancement, etc., to obtain processed version 422 of image 402. Processed version 422 is passed onto clipping marker circuit 424. Clipping marker circuit 424 identifies clipped (e.g., oversaturated) pixels in processed version 422 of image 402 having one or more color component values that exceed threshold values as clipping markers. Clipping marker circuit 424 may replace the pixel values with predetermined pixel values so that any of these pixels or any other pixel derived from these pixels downstream from clipping marker circuit 424 can be identified and addressed appropriately in subsequent processing, such as corresponding morphological operations (e.g., erosion or dilation) of the clipping markers. For example, the morphological operations can be conducted during a warping operation performed by warping circuit 428, during a pyramid generation performed by pyramid generator circuit 432, and/or during a fusion operation performed by image fusion processing module 444, e.g., during upscaling and extracting of high frequency components in multi-scale image fusion circuit 502 of FIG. 5A and in image fusion circuit 503 of FIG. 5B.

Warping circuit 428 accommodates the linear and non-linear transformations defined by the model generated by CPU 208. Warping circuit 428 warps processed image 426 using the mapping information according to the warping parameters 418 to generate warped version 430 of image 402 (warped image 430) spatially more aligned to image 404 than to image 402. Alternatively (not shown in FIG. 4), warping circuit 428 warps image 404 using the mapping information in model 418 to generate warped version 430 of image 404 spatially more aligned to image 402 than to image 404. Warped image 430 generated by warping circuit 428 is then passed onto pyramid generator circuit 432.

Pyramid generator circuit 432 generates multiple downscaled warped images each having a different resolution by sequentially downscaling warped image 430. Each downscaled warped image includes the multiple color components. The downscaled warped images obtained from warped image 430 may be stored in e.g., system memory 230 (not shown in FIG. 4). Low frequency components of the downscaled warped images and a low frequency component of an unscaled single color version (e.g., luma component) of warped image 430 are passed as warped image data 434 onto image fusion processing circuit 444 for fusion with corresponding image data 442 obtained from image 404. Note that in some embodiments, image enhancement processor 420, clipping locator circuit 424, warping circuit 428, and pyramid generator circuit 432 are part of noise processing stage 310. In some embodiments, one or more of image enhancement processor 420, clipping locator circuit 424, warping circuit 428, and pyramid generator circuit 432 are outside of noise processing stage 310, such as in another stage of back-end pipeline stages 340.

Image enhancement processor 436 performs certain processing of image 404 (e.g., noise removal, enhancement, etc.) to obtain processed image 438 for passing onto pyramid generator circuit 440. Image enhancement processor 436 may perform substantially same operations as image enhancement processor 420. Pyramid generator circuit 440 generates multiple downscaled images each having a different resolution by sequentially downscaling processed image 438. Each downscaled image generated by pyramid generator circuit 440 includes the multiple color components (e.g., luma and chroma components). The downscaled images obtained from processed image 438 may be stored in, e.g., system memory 230. Low frequency components of the downscaled images and a low frequency component of an unscaled single color version (e.g., luma component) of processed image 438 are passed onto image fusion processing circuit 444 as image data 442. Note that in some embodiments, image enhancement processor 436 and pyramid generator circuit 440 are part of noise processing stage 310. In some embodiments, at least one of image enhancement processor 436 and pyramid generator circuit 440 is outside of noise processing stage 310, such as in another stage of back-end pipeline stages 340.

Image fusion processing circuit 444 performs per pixel blending between a portion of warped image data 434 related to the unscaled single color version of warped image 430 with a portion of image data 442 related to the unscaled single color version of processed image 438 to generate unscaled single color version of fused image 446. Image fusion processing circuit 444 also performs per pixel blending between a portion of warped image data 434 related to a downscaled warped image (obtained by downscaling warped image 430) and a portion of image data 442 related to a corresponding downscaled image (obtained by downscaling processed image 438) to generate first downscaled version 448 of the fused image comprising the multiple color components. First downscaled version 448 has a pixel resolution equal to a quarter of a pixel resolution of unscaled single color version 446. Unscaled single color version 446 and first downscaled version 448 are passed onto post-processing circuit 450 for further processing and enhancement. Image fusion processing circuit 444 includes multi-scale image fusion circuit 502 shown in FIG. 5A and image fusion circuit 503 shown in FIG. 5B. More details about structure and operation of image fusion processing circuit 444 are provided below in detail in conjunction with FIGS. 5A-5B and FIGS. 6A-6B.

Post-processing circuit 450 performs post-processing of unscaled single color version 446 and first downscaled version 448 to obtain post-processed fused image 472. Post-processing circuit 450 may be part of color processing stage 312. Post-processing circuit 450 includes sub-band splitter (SBS) circuit 452, local tone mapping (LTM) circuit 458, local contrast enhancement (LCE) circuit 462, sub-band merger (SBM) circuit 466 and sharpening circuit 470. SBS circuit 452 performs sub-band splitting of unscaled single color version 446 to generate high frequency component of unscaled single color version 454 passed onto SBM circuit 466. SBS circuit 452 also performs sub-band splitting of first downscaled version 448 to generate low frequency component of first downscaled version 456 passed onto LTM circuit 458. LTM circuit 458 performs LTM operation on low frequency component of first downscaled version 456 to generate processed version of low frequency component of first downscaled version 460 passed onto LCE circuit 462. LCE circuit 462 performs local photometric contrast enhancement of a single color component (e.g., luma component) of processed version of low frequency component of first downscaled version 460 to generate enhanced version of first downscaled version of fused image 464. SBM circuit 466 merges high frequency component of unscaled single color version 454 and enhanced version of first downscaled version of fused image 464 to generate merged fused image data 468 passed onto sharpening circuit 470. Sharpening circuit 470 performs sharpening (e.g., photometric contrast enhancement) on a single color component (e.g., luma component) of merged fused image data 468 to generate post-processed fused image 472. Post-processed fused image 472 can be passed to output rescale 314 and then output interface 316. The processing performed at post-processing circuit 450 is merely an example, and various other post-processing may be performed as an alternative or as an addition to the processing at post processing circuit 450.

Example Architecture for Image Fusion Processing

Figure 5A:
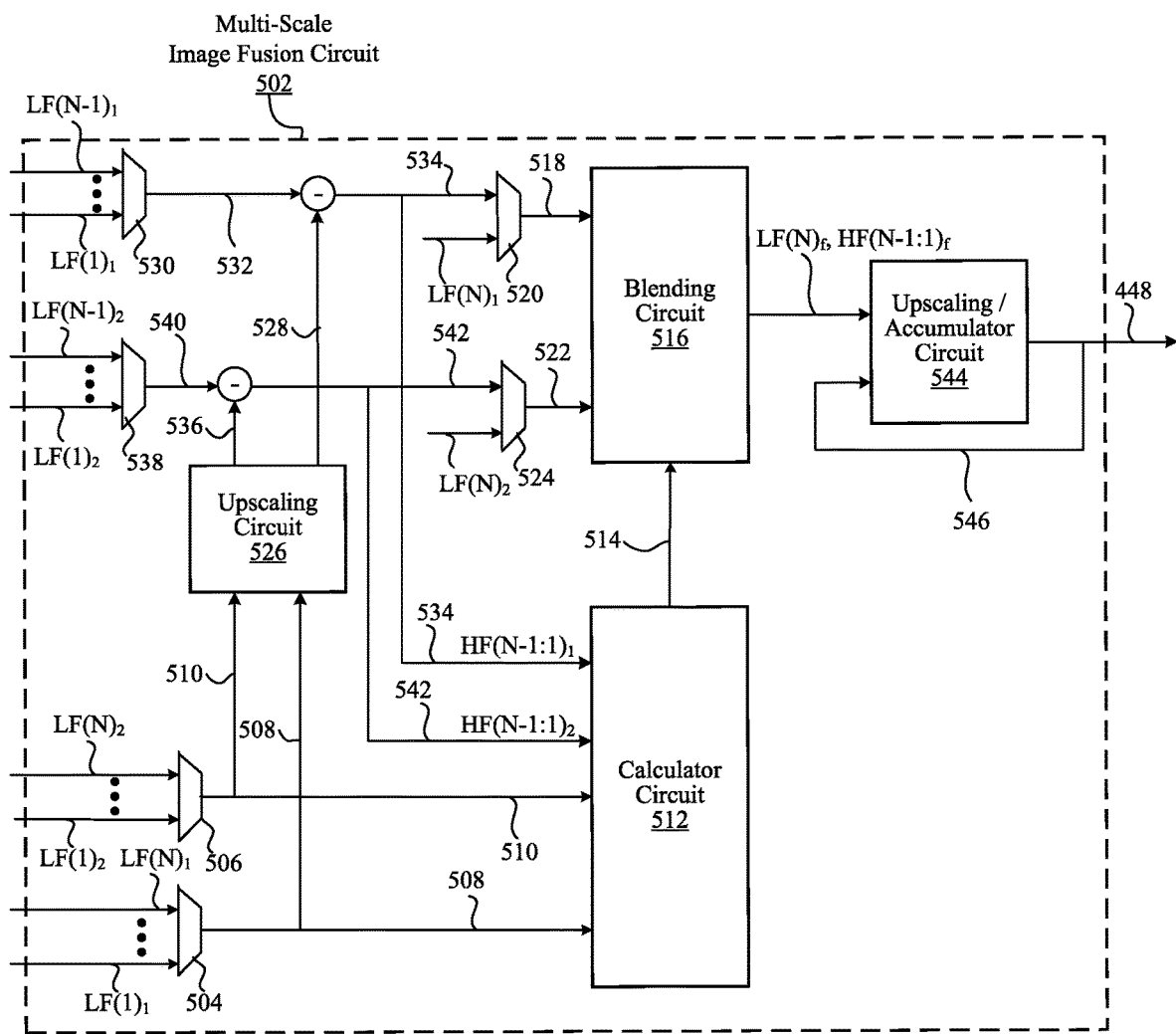
FIG. 5A is a detailed block diagram of a multi-scale image fusion circuit of an image fusion processor, according to one embodiment.

FIG. 5A is a detailed block diagram of multi-scale image fusion circuit 502 as part of image fusion processing circuit 444, according to one embodiment. Multi-scale image fusion circuit 502 performs per pixel blending between each downscaled multi-color version of warped image 430 with a corresponding downscaled multi-color version of processed image 438 to generate a downscaled multi-color version of a fused image of multiple downscaled versions of the fused image. Multi-scale image fusion circuit 502 generates first downscaled version of fused image 448 by upscaling and accumulating the multiple downscaled versions of the fused image. First downscaled version of fused image 448 includes multiple color components and has a pixel resolution lower than a pixel resolution of unscaled single color version of fused image 446.

Multi-scale image fusion circuit 502 receives low frequency components of the downscaled multi-color warped images $LF(1)_1, LF(2)_1, \ldots, LF(N)_1$ as part of warped image data 434 (obtained by downscaling warped image 430 by pyramid generator 432), where N represents levels of downsampling performed on warped image 430, e.g., N=6. Multi-scale image fusion circuit 502 further receives low frequency components of the downscaled multi-color images LF(1)$_2$, LF(2)$_2$, . . . , LF(N)$_2$ as part of image data 442 (obtained by downscaling processed image 438 by pyramid generator 440). The downscaled warped image with the lowest level of resolution LF(N)$_1$ is first passed via multiplexer 504 onto calculator circuit 512 as downscaled warped image data 508. The downscaled image with the lowest level of resolution LF(N)$_2$ is also passed via multiplexer 506 onto calculator circuit 512 as downscaled image data 510.

Calculator circuit 512 determines a patch distance for a pixel by processing photometric distances between pixels in a patch of downscaled warped image data 508 and corresponding pixels in a patch of downscaled image data 510. The patch of downscaled warped image data 508 includes the pixel as a central pixel and other pixels within defined spatial distance from the pixel. A patch distance represents a measure of similarity between two patches. Calculator circuit 512 calculates the patch distance as a sum of Euclidian distances between corresponding pixels in both patches. For 5×5 patches, calculator circuit 512 calculates the patch distance as:

$$PD = \Sigma_{i=-2}^{i=2} \Sigma_{j=-2}^{2} ED(P1_{ij}, P2_{ij}) \qquad \text{Equation 1}$$

where ED(P1$_{ij}$, P2$_{ij}$) is an Euclidian distance between pixels P1$_{ij}$ and P2$_{ij}$ of the first and second patch; i and j are indexes within a 5×5 patch window. Optionally, the patch size can be reduced to 3×3 or to 1×1 (a single pixel mode) independently for each scale, in which case the summation indexes i and j in Equation 1 are adjusted accordingly.

Alternatively, calculator circuit 512 calculates the patch distance in a recursive manner. If PD(n) for pixel n is known, then calculator circuit 512 calculates PD(n+1) for next right horizontal neighbor of pixel n as:

$$PD(n+1) = PD(n) - \Sigma_{j=-2}^{2} ED(P1_{3,j}, P2_{3,j}) + \Sigma_{j=-2}^{2} ED(P1_{2,j}, P2_{2,j}) \qquad \text{Equation 2}$$

Calculator circuit 512 also determines a cross-correlation value (e.g., normalized cross-correlation) for the pixel by determining a cross variance between pixel values of the patch of downscaled warped image data 508 and pixel values of the patch of downscaled image data 510. The normalized cross-correlation is used as a secondary measure of patch similarity. Calculator circuit 512 calculates the normalized cross-correlation (e.g., a coefficient between −1 and 1) as:

$$NCC = \frac{VARC}{\sqrt{VAR1 * VAR2}} \qquad \text{Equation 3}$$

where VAR1 and VAR2 are variances of the patches and VARC is their cross variance.

Calculator circuit 512 determines blend parameter 514 for the pixel as a function of two similarity measures, the patch distance (e.g., PD determined by Equation 1 or Equation 2) and the cross-correlation value (e.g., the normalized cross correlation NCC determined by Equation 3). If the patches are more similar, a higher level of blending is performed to avoid ghosting, and vice versa. The patch distance similarity score, SPD, is given by:

$$SPD = F1(PD/\text{expected noise standard variation}). \qquad \text{Equation 4}$$

In accordance with Equation 4, SPD indicates that patches that differ less than an expected noise are similar ("close"). The NCC similarity score, SNCC, is given by:

$$SNCC = F2(1 - \max(0, NCC)), \qquad \text{Equation 5}$$

where functions F1 and F2 are non-linear functions, e.g., Gaussian shaped functions that can be emulated with defined slope and knee parameters. A final similarity score, S, may be determined as a sum of SPD and SNCC. For example, the final similarity score can be determined as:

$$S = \min(1, SPD + SNCC) \qquad \text{Equation 6}$$

Alternatively, the final similarity score, S, may be determined based on some other combination of SPD and SNCC.

Calculator circuit 512 determines blend parameter 514, w, for the pixel as a normalized combination of weight W1 for the pixel of a reference (first) image and weight W2*S for a pixel of a second image. W1 and W2 are programmable fusion weights. If the patches are completely dissimilar, then W2=0 and only the pixel from the reference image is used. If the patched are completely similar, then fusion with weights W1 and W2 is performed. The ghost suppression is achieved by decreasing (in some cases to 0) weights of pixels that originate from dissimilar second image regions. Blend parameter 514, w, is given by:

$$w = W1/(W1 + W2 * S) \qquad \text{Equation 7}$$

Blend parameter 514 is set to zero for pixels (e.g., clipping markers) marked by clipping marker circuit 424 as overexposed pixels and their derivatives are not used for blending, thus achieving proper handling of highlights in the high dynamic range case.

Blend parameter 514 for the pixel is passed onto blending circuit 516. Blending circuit 516 blends pixel value 518 of the pixel of the downscaled warped image LF(N)$_1$ (passed via multiplexer 520 onto blending circuit 516) with pixel value 522 of a corresponding pixel of the downscaled image LF(N)$_2$ (passed via multiplexer 524 onto blending circuit 516) using blend parameter 514 for the pixel to generate a blended pixel value for a pixel of a downscaled fused image with the lowest level of resolution LF(N)$_f$ passed onto upscaling/accumulator circuit 544. Blending circuit 516 blends a pair of pixel values x$_1$(i,j) and x$_2$(i,j) in two different images (e.g., images LF(N)$_1$, LF(N)$_2$) corresponding to the same spatial coordinate (i,j) in both images using blend parameter 514 (weight) w(i,j) to a obtain a blended pixel value b(i,j) as given by:

$$b(i,j) = w(i,j) * x_1(i,j) + (1 - w(i,j)) * x_2(i,j) \qquad \text{Equation 8}$$

The downscaled warped image LF(N)$_1$ and downscaled image LF(N)$_2$ are also passed (via multiplexers 504 and 506) as downscaled warped image data 508 and downscaled image data 510 onto upscaling circuit 526. Upscaling circuit 526 upscales downscaled warped image data 508 two times in both horizontal and vertical dimensions to generate upscaled warped image data 528 (scale N−1). Multiplexer 530 passes downscaled warped image LF(N−1)$_1$ as downscaled warped image data 532. Pixel values of upscaled warped image data 528 are subtracted from corresponding pixel values of downscaled warped image data 532 (scales N−1) to generate warped image data 534 representing a high frequency component of downscaled warped image HF(N−1)$_1$ passed onto calculator circuit 512 and onto blending circuit 516 (via multiplexer 520) as pixel values 518. Upscaling circuit 526 also upscales downscaled image data 510 two times in both horizontal and vertical dimensions to generate upscaled image data 536 (scale N−1). Multiplexer 538 passes downscaled image LF(N−1)$_2$ as downscaled image data 540. Pixel values of upscaled image data 536 are subtracted from downscaled image data 540 (scales N−1) to generate image data 542 representing a high frequency component of downscaled image HF(N−1)$_2$ passed onto calculator circuit 512 and onto blending circuit 516 (via multiplexer 524) as pixel values 522.

Calculator circuit 512 determines a patch distance for a pixel of warped image data 534 by processing photometric distances between pixels in a patch of warped image data 534 (e.g., the high frequency component of downscaled warped image HF(N−1)$_1$) and corresponding pixels in a patch of image data 542 (e.g., the high frequency component of downscaled image HF(N−1)$_2$), as defined by Equation 1 or Equation 2. The downscaled warped image LF(N−1)$_1$ is further passed via multiplexer 504 onto calculator circuit 512 as downscaled warped image data 508. The downscaled image LF(N−1)$_2$ is also passed via multiplexer 506 onto calculator circuit 512 as downscaled image data 510. Calculator circuit 512 determines a cross-correlation value (e.g., normalized cross-correlation) for the pixel by determining a cross variance between pixel values of a patch of downscaled warped image data 508 (e.g., the low frequency component of the downscaled warped image LF(N−1)$_1$) and pixel values of the patch of downscaled image data 510 (e.g., the low frequency component of the downscaled image LF(N−1)$_2$), as defined by Equation 3.

Calculator circuit 512 determines blend parameter 514 for the pixel as a function of the patch distance and the cross-correlation value, e.g., as defined above in accordance with Equations 4-7 but for high frequency components of the downscaled warped image HF (N−1)$_1$ and the downscaled image HF(N−1)$_2$). Blend parameter 514 for the pixel is passed onto blending circuit 516. Blending circuit 516 blends pixel value 518 of the pixel of the high frequency component of downscaled warped image HF(N−1)$_1$ with pixel value 522 of a corresponding pixel of the high frequency component of downscaled image HF(N−1)$_2$ using blend parameter 514 for the pixel (as defined by Equation 8) to generate a blended pixel value for a pixel of a high frequency component of downscaled fused image HF(N−1)$_f$ passed onto upscaling/accumulator circuit 544. This process of determining blending parameter 514, upscaling by upscaling circuit 526 and per-pixel blending by blending circuit 516 is recursively repeated until a high frequency component of a first downscaled version of fused image HF(1)$_f$ is generated at the output of blending circuit 516 and passed onto upscaling/accumulator circuit 544.

Figure 6A:
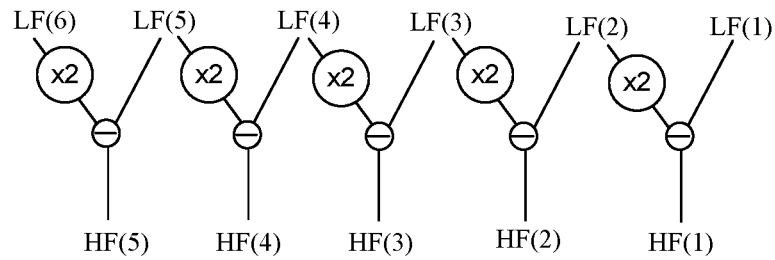
FIG. 6A is a conceptual diagram illustrating upscaling downscaled images as part of image fusion processing, according to one embodiment.

FIG. 6A is a conceptual diagram illustrating upscaling downscaled images as part of recursive image fusion processing shown in FIG. 5A, according to one embodiment. In the example of FIG. 6A, an input image (e.g., warped image 430 or processed image 438) is assumed to be downscaled 6 times (e.g., by pyramid generator 432 or pyramid generator 440) to generate low frequency components of downscaled images LF(6), LF(5), . . . , LF(1) that are input into multi-scale image fusion circuit 502. Upscaling circuit 526 upscales the low frequency component of downscaled image LF(6) two times in both horizontal and vertical dimensions and subtracts its upscaled version from the low frequency component of downscaled image LF(5) to generate a high frequency component of downscaled image HF(5) (e.g., warped and non-warped image data 534 and 542) passed onto calculator circuit 512 and blending circuit 516. Then, upscaling circuit 526 upscales the low frequency component of downscaled image LF(5) two times in both horizontal and vertical dimensions and subtracts its upscaled version from the low frequency component of downscaled image LF(4) to generate a high frequency component of downscaled image HF(4) (e.g., warped and non-warped image data 534 and 542) passed onto calculator circuit 512 and blending circuit 516. This process is repeated by upscaling circuit 526 until a high frequency component of first downscaled version HF(1) (e.g., warped and non-warped image data 534 and 542) is generated and passed onto calculator circuit 512 and blending circuit 516.

Referring back to FIG. 5A, upscaling/accumulator circuit 544 performs the process of image restoration to generate first downscaled version 448 of the fused image using fused downscaled versions LF(N)$_f$, HF(N−1)$_f$, HF(N−2)$_f$, . . . , HF(1)$_f$. More details about this process is described herein with reference to FIG. 6B.

Figure 6B:
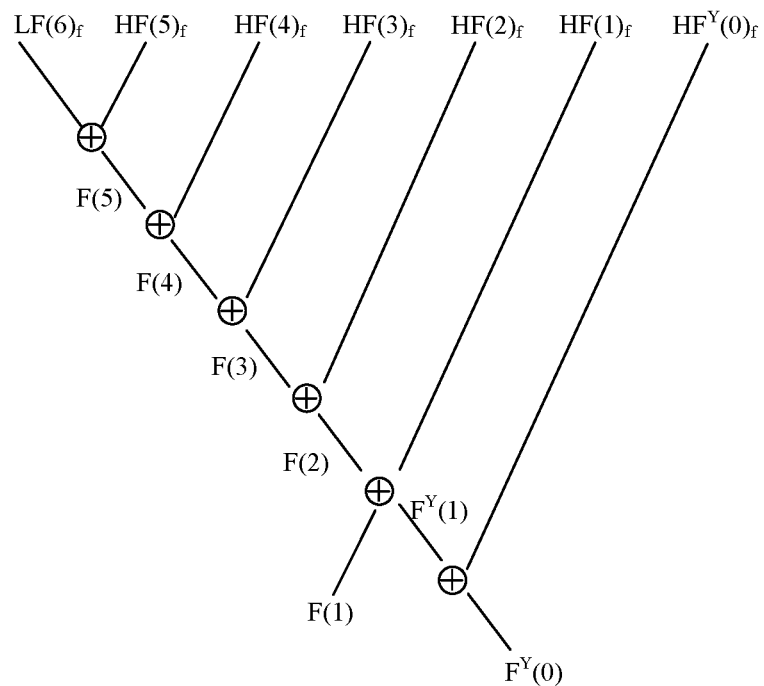
FIG. 6B is a conceptual diagram illustrating recursively upscaling and accumulating downscaled images as part of image fusion processing, according to one embodiment.

FIG. 6B is a conceptual diagram illustrating recursively upscaling and accumulating downscaled images as part of image fusion processing, according to one embodiment. In the example of FIG. 6B, blending circuit 516 generates fused downscaled versions LF(6)$_f$, HF(5)$_f$, HF(4)$_f$, . . . , HF(1)$_f$ passed onto upscaling/accumulator circuit 544. Upscaling/accumulator circuit 544 upscales fused downscaled version LF(6)$_f$ two times in both horizontal and vertical dimensions and sums its upscaled version with fused downscaled version HF(5)$_f$ to generate downscaled fused image 546, e.g., F(5). Upscaling/accumulator circuit 544 upscales downscaled fused image 546 (e.g., F(5)) two times in both horizontal and vertical dimensions and sums its upscaled version with fused downscaled version HF(4)$_f$ to generate downscaled fused image 546, e.g., F(4). This process is repeated until upscaling/accumulator circuit 544 generates first downscaled version of fused image 448, e.g., fused image F(1) comprising the multiple color components.

Figure 5B:
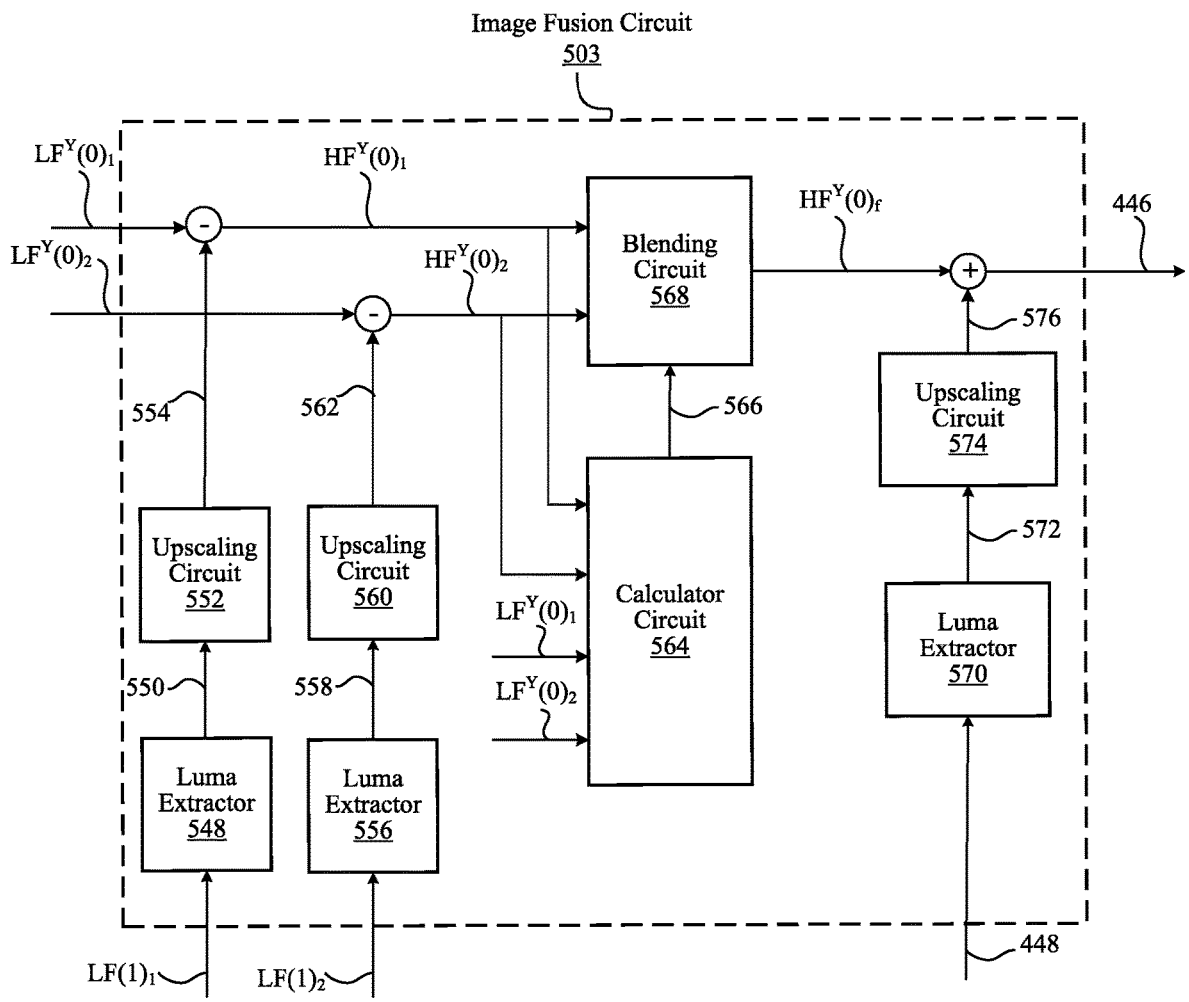
FIG. 5B is a detailed block diagram of an image fusion circuit of the image fusion processor, according to one embodiment.

FIG. 5B is a detailed block diagram of image fusion circuit 503 as part of image fusion processing circuit 444, according to one embodiment. Image fusion circuit 503 performs per pixel blending between unscaled single color version (e.g., luma component) of warped image 430, LF$^Y$(0)$_1$, with unscaled single color version (e.g., luma component) of processed image 438, LF$^Y$(0)$_2$, to generate unscaled single color version of fused image 446. Image fusion circuit 503 receives, as part of warped image data 434 and image data 442, unscaled single color version LF$^Y$(0)$_1$ and unscaled single color version LF$^Y$(0)$_2$, respectively. Image fusion circuit 503 further receives, within warped image data 434, downscaled warped image LF(1)$_1$ obtained by downscaling warped image 430 by pyramid generator 432. Image fusion circuit 503 also receives, within image data 442, downscaled image LF(1)$_2$ obtained by downscaling processed image 438 by pyramid generator 440.

Luma extractor circuit 548 extracts a single color component (luma component) from downscaled warped image LF(1)$_1$ to generate single color version of downscaled warped image 550 passed onto upscaling circuit 552. Upscaling circuit 552 upscales single color version of downscaled warped image 550 twice in both spatial dimensions to generate single color version of upscaled warped image 554. Pixel values of single color version of upscaled warped image 554 are subtracted from corresponding pixel values of unscaled single color version LF$^Y$(0)$_1$ to generate a high frequency component of unscaled single color version of warped image HF$^Y$(0)$_1$ passed onto calculator circuit 564 and blending circuit 568. Unscaled single color version LF$^Y$(0)$_1$ is also passed onto calculator circuit 564.

Luma extractor circuit 556 extracts a single color component (luma component) from downscaled image LF(1)$_2$ to generate single color version of downscaled image 558 passed onto upscaling circuit 560. Upscaling circuit 560 upscales single color version of downscaled image 558 twice in both spatial dimensions to generate single color version of upscaled image 562. Pixel values of single color version of upscaled image 562 are subtracted from corresponding pixel values of unscaled single color version $LF^Y(0)_2$ to generate a high frequency component of unscaled single color version $HF^Y(0)_2$ passed onto calculator circuit 564 and blending circuit 568. Unscaled single color version $LF^Y(0)_2$ is also passed onto calculator circuit 564.

Calculator circuit 564 determines a patch distance for a pixel by processing photometric distances between pixels in a patch of the high frequency component of unscaled single color version of warped image $HF^Y(0)_1$ and corresponding pixels in a patch of the high frequency component of unscaled single color version $HF^Y(0)_2$, as defined by Equation 1 or Equation 2. Calculator circuit 564 operates in the same manner as calculator circuit 512 of multi-scale image fusion circuit 502 except that calculator circuit 564 processes single color images whereas calculator circuit 512 processes multi-color images. Calculator circuit 564 also determines a cross-correlation value for the pixel by determining a cross variance between pixel values of a patch of unscaled single color version $LF^Y(0)_1$ and corresponding pixel values of a patch of unscaled single color version $LF^Y(0)_2$, as defined by Equation 3. Calculator circuit 564 determines blend parameter 566 for the pixel as a function of the patch distance and the cross-correlation value. Blend parameter 566 for the pixel is passed onto blending circuit 568. Blending circuit 568 blends a pixel value of the pixel of the high frequency component of unscaled single color version of warped image $HF^Y(0)_1$ with a pixel value of a corresponding pixel of the high frequency component of unscaled single color version $HF^Y(0)_2$ using blend parameter 566 for the pixel (as defined by Equation 8) to generate a blended pixel value for a pixel of a high frequency component of unscaled single color version of fused image $HF^Y(0)_f$. Blending circuit 568 operates in the same manner as blending circuit 516 of multi-scale image fusion circuit 502 except that blending circuit 568 performs per pixel blending of single color images whereas blending circuit 516 performs per pixel blending of multi-color images.

Image fusion circuit 503 also receives first downscaled version of fused image 448 generated by multi-scale image fusion circuit 502. Luma extractor circuit 570 extracts a single color component (luma component) from first downscaled version of fused image 448 to generate single color version of first downscaled version of fused image 572 passed onto upscaling circuit 574. Upscaling circuit 574 upscales a single color version of first downscaled version of fused image 572 twice in both spatial dimensions (horizontal and vertical dimensions) to generate a single color version of upscaled fused image 576. Pixel values of single color version of upscaled fused image 576 are summed with corresponding pixel values of the high frequency component of unscaled single color version of fused image $HF^Y(0)_f$ to generate unscaled single color version of fused image 446.

As further shown in FIG. 6B, a single color component (e.g., luma component) is extracted (via luma extractor 570) from the first downscaled multi-color version of fused image F(1) to generate a first downscaled single color version of fused image $F^Y(1)$. The first downscaled single color version of fused image is upscaled (via upscaling circuit 574) and summed to the high frequency component of unscaled single color version of fused image $HF^Y(0)_f$ to generate an unscaled single color version of fused image $F^Y(0)$, e.g., unscaled single color version 446.

Example Process for Performing Image Fusion Processing

Figure 7:
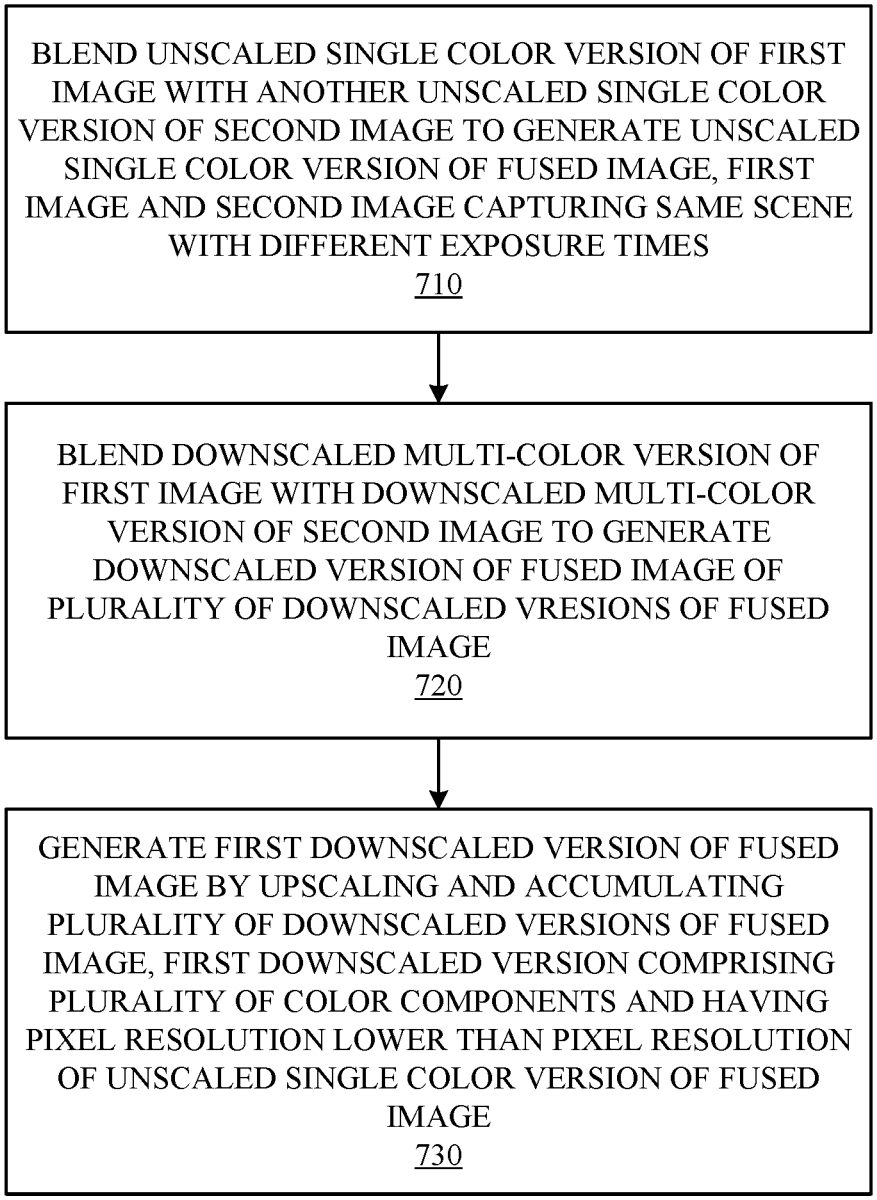
FIG. 7 is a flowchart illustrating a method of image fusion processing, according to one embodiment.

FIG. 7 is a flowchart illustrating a method of image fusion processing, according to one embodiment. The method may include additional or fewer steps, and steps may be performed in different orders. Image fusion processing circuit 503 of image fusion processing circuit 444, as described with reference to FIG. 5B, blends 710 an unscaled single color version of a first image with another unscaled single color version of a second image to generate an unscaled single color version of a fused image, the first image and the second image capturing a same scene with different exposure times.

Multi-scale image fusion processing circuit 502 of image fusion processing circuit 444, as described with reference to FIG. 5A, blends 720 a downscaled multi-color version of the first image with a downscaled multi-color version of the second image to generate a downscaled multi-color version of the fused image of multiple downscaled versions of the fused image. Multi-scale image fusion processing circuit 502 generates 730 a first downscaled version of the fused image by upscaling and accumulating the multiple downscaled versions of the fused image. The first downscaled version comprises multiple color components and has a pixel resolution lower than a pixel resolution of the unscaled single color version of the fused image.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An apparatus for image fusion processing, comprising:
an image fusion circuit configured to:
determine a blend parameter for each pixel in at least a portion of a first image by using pixel values in a first patch of an unsealed single color version of the first image and pixel values in a second patch of another unsealed single color version of a second image, the first and second images capturing a same scene with different exposure times, and
blend, per pixel, the unsealed single color version with the other unsealed single color version using the blend parameter for each pixel to generate an unsealed single color version of a fused image; and
a multi-scale image fusion circuit configured to:
blend, per pixel, a downscaled multi-color version of the first image with a downscaled multi-color version of the second image to generate a downscaled multi-color version of the fused image of a plurality of downscaled versions of the fused image, and
generate a first downscaled version of the fused image by upscaling and accumulating the plurality of downscaled versions of the fused image, the first downscaled version comprising a plurality of color components and having a pixel resolution lower than a pixel resolution of the unsealed single color version of the fused image.

2. The apparatus of claim 1, wherein the image fusion circuit is further configured to:
blend, for each pixel, the unsealed single color version with the other unsealed single color version by processing the first patch of the unsealed single color version and the second patch of the other unsealed single color version.

3. The apparatus of claim 1, wherein the image fusion circuit further comprising:
a calculator circuit configured to:

determine a patch distance for each pixel by processing photometric distances between pixels in the first patch and corresponding pixels in the second patch, determine a cross-correlation value for each pixel by determining a cross variance between pixel values of the first patch and pixel values of the second patch, and determine the blend parameter for each pixel as a function of the patch distance for each pixel and the cross-correlation value for each pixel; and a blending circuit configured to blend, per pixel, the unsealed single color version with the other unsealed single color version using the blend parameter for each pixel to generate the unsealed single color version of the fused image.

4. The apparatus of claim 1, wherein the multi-scale image fusion circuit is further configured to:

blend, per pixel, the downscaled multi-color version of the first image with the downscaled multi-color version of the second image by processing a first patch of the downscaled multi-color version of the first image and a second patch of the downscaled multi-color version of the second image.

5. The apparatus of claim 4, wherein the multi-scale image fusion circuit further comprising:

an upscaling circuit configured to generate a plurality of downscaled multi-color versions of the first image and a plurality of downscaled multi-color versions of the second image by sequentially upscaling corresponding downscaled multi-color versions of the first and second images;

a calculator circuit configured to:
determine a patch distance for each pixel by processing photometric distances between pixels in the first patch of the downscaled multi-color version of the first image and corresponding pixels in the second patch of the downscaled multi-color version of the second image, determine a cross-correlation value for each pixel by determining a cross variance between pixel values of the first patch of the downscaled multi-color version of the first image and pixel values of the second patch of the downscaled multi-color version of the second image, and determine another blend parameter for each pixel as a function of the patch distance for each pixel and the cross-correlation value for each pixel; and a blending circuit configured to blend, per pixel, the downscaled multi-color version of the first image with the downscaled multi-color version of the second image using the other blend parameter for each pixel to generate the downscaled multi-color version of the fused image.

6. The apparatus of claim 5, wherein the calculator circuit is further configured to:

determine the patch distance for each pixel by processing the photometric distances between the pixels in the first patch of a high frequency component of the downscaled multi-color version of the first image and the pixels in the second patch of a high frequency component of the downscaled multi-color version of the second image; and determine the cross-correlation value for each pixel by determining the cross variance between the first patch of a low frequency component of the downscaled multi-color version of the first image and the second patch of a low frequency component of the downscaled multi-color version of the second image.

7. The apparatus of claim 5, wherein the calculator circuit is further configured to:

determine a normalized version of the cross-correlation value for each pixel by normalizing the cross variance using a variance of the pixel values of the first patch of the downscaled multi-color version of the first image and a variance of the pixel values of the second patch of the downscaled multi-color version of the second image; and determine the other blend parameter for each pixel as a function of the patch distance for each pixel and the normalized version of the cross-correlation value for each pixel.

8. The apparatus of claim 1, wherein the first downscaled version of the fused image has the pixel resolution equal to a quarter of the pixel resolution of the unsealed single color version of the fused image.

9. The apparatus of claim 1, wherein the apparatus further comprising:

a sub-band splitter (SBS) circuit configured to perform sub-band splitting operations on the unsealed single color version of the fused image and on the first downscaled version of the fused image.

10. A method of image fusion processing, comprising:

determining a blend parameter for each pixel in at least a portion of a first image by using pixel values in a first patch of an unsealed single color version of the first image and pixel values in a second patch of another unsealed single color version of a second image, the first and second images capturing a same scene with different exposure times;

blending, per pixel, the unsealed single color version with the other unsealed single color version using the blend parameter for each pixel to generate an unsealed single color version of a fused image;

blending, per pixel, a downscaled multi-color version of the first image with a downscaled multi-color version of the second image to generate a downscaled multi-color version of the fused image of a plurality of downscaled versions of the fused image; and generating a first downscaled version of the fused image by upscaling and accumulating the plurality of downscaled versions of the fused image, the first downscaled version comprising a plurality of color components and having a pixel resolution lower than a pixel resolution of the unsealed single color version of the fused image.

11. The method of claim 10, further comprising:

blending, for each pixel, the unsealed single color version with the other unsealed single color version by processing the first patch of the unsealed single color version and the second patch of the other unsealed single color version.

12. The method of claim 10, further comprising:

determining a patch distance for each pixel by processing photometric distances between pixels in the first patch and corresponding pixels in the second patch;

determining a cross-correlation value for each pixel by determining a cross variance between pixel values of the first patch and pixel values of the second patch; and determining the blend parameter for each pixel as a function of the patch distance for each pixel and the cross-correlation value for each pixel.

13. The method of claim 10, further comprising:

blending, per pixel, the downscaled multi-color version of the first image with the downscaled multi-color version of the second image by processing a first patch of the downscaled multi-color version of the first image and a second patch of the downscaled multi-color version of the second image.

14. The method of claim 13, further comprising:
generating a plurality of downscaled multi-color versions of the first image and a plurality of downscaled multi-color versions of the second image by sequentially upscaling corresponding downscaled multi-color versions of the first and second images;
determining a patch distance for each pixel by processing photometric distances between pixels in the first patch of the downscaled multi-color version of the first image and corresponding pixels in the second patch of the downscaled multi-color version of the second image;
determining a cross-correlation value for each pixel by determining a cross variance between pixel values of the first patch of the downscaled multi-color version of the first image and pixel values of the second patch of the downscaled multi-color version of the second image;
determining another blend parameter for each pixel as a function of the patch distance for each pixel and the cross-correlation value for each pixel; and
blending, per pixel, the downscaled multi-color version of the first image with the downscaled multi-color version of the second image using the other blend parameter for each pixel to generate the downscaled multi-color version of the fused image.

15. The method of claim 14, further comprising:
determining the patch distance for each pixel by processing the photometric distances between the pixels in the first patch of a high frequency component of the downscaled multi-color version of the first image and the pixels in the second patch of a high frequency component of the downscaled multi-color version of the second image; and
determining the cross-correlation value for each pixel by determining the cross variance between the first patch of a low frequency component of the downscaled multi-color version of the first image and the second patch of a low frequency component of the downscaled multi-color version of the second image.

16. The method of claim 14, wherein further comprising:
determining a normalized version of the cross-correlation value for each pixel by normalizing the cross variance using a variance of the pixel values of the first patch of the downscaled multi-color version of the first image and a variance of the pixel values of the second patch of the downscaled multi-color version of the second image; and
determining the other blend parameter for each pixel as a function of the patch distance for each pixel and the normalized version of the cross-correlation value for each pixel.

17. The method of claim 10, wherein the first downscaled version of the fused image has the pixel resolution equal to a quarter of the pixel resolution of the unscaled single color version of the fused image.

18. The method of claim 10, further comprising:
performing sub-band splitting operations on the unscaled single color version of the fused image and on the first downscaled version of the fused image.

19. A system, comprising:
an image sensor configured to obtain a first image and a second image each having a plurality of color components, the first image and the second image capturing a same scene with different exposure times; and
an image signal processor coupled to the image sensor, the image signal processor configured to perform processing of the first image and the second image to obtain a fused image having the plurality of color components, the image signal processor including:
an image fusion circuit configured to:
determine a blend parameter for each pixel in at least a portion of the first image by using pixel values in a first patch of an unsealed single color version of the first image and pixel values in a second patch of another unsealed single color version of the second image, and
blend, per pixel, the unsealed single color version with the other unsealed single color version using the blend parameter for each pixel to generate an unsealed single color version of the fused image; and
a multi-scale image fusion circuit configured to:
blend, per pixel, a downscaled multi-color version of the first image with a downscaled multi-color version of the second image to generate a downscaled multi-color version of the fused image of a plurality of downscaled versions of the fused image, and
generate a first downscaled version of the fused image by upscaling and accumulating the plurality of downscaled versions of the fused image, the first downscaled version comprising the plurality of color components and having a pixel resolution lower than a pixel resolution of the unsealed single color version of the fused image.

20. The system of claim 19, wherein the multi-scale image fusion circuit further comprising:
an upscaling circuit configured to generate a plurality of downscaled multi-color versions of the first image and a plurality of downscaled multi-color versions of the second image by sequentially upscaling corresponding downscaled multi-color versions of the first and second images;
a calculator circuit configured to:
determine a patch distance for each pixel by processing photometric distances between pixels in a first patch of the downscaled multi-color version of the first image and corresponding pixels in a second patch of the downscaled multi-color version of the second image,
determine a cross-correlation value for each pixel by determining a cross variance between pixel values of the first patch of the downscaled multi-color version of the first image and pixel values of the second patch of the downscaled multi-color version of the second image, and
determine another blend parameter for each pixel as a function of the patch distance for each pixel and the cross-correlation value for each pixel; and
a blending circuit configured to blend, per pixel, the downscaled multi-color version of the first image with the downscaled multi-color version of the second image using the other blend parameter for each pixel to generate the downscaled multi-color version of the fused image.

* * * * *

UNITED STATES PATENT AND TRADEMARK OFFICE
CERTIFICATE OF CORRECTION

PATENT NO. : 10,853,928 B2
APPLICATION NO. : 16/370662
DATED : December 1, 2020
INVENTOR(S) : Maxim W. Smirnov and Elena Lamburn Page 1 of 1

It is certified that error appears in the above-identified patent and that said Letters Patent is hereby corrected as shown below:

In the Claims

Claim 1, Line 36, Column 22, please change the word "unsealed" to "unscaled"
Claim 1, Line 38, Column 22, please change the word "unsealed" to "unscaled"
Claim 1, Line 41, Column 22, please change the word "unsealed" to "unscaled"
Claim 1, Line 42, Column 22, please change the word "unsealed" to "unscaled"
Claim 1, Line 44, Column 22, please change the word "unsealed" to "unscaled"
Claim 1, Line 56, Column 22, please change the word "unsealed" to "unscaled"
Claim 2, Line 60, Column 22, please change the word "unsealed" to "unscaled"
Claim 2, Line 61, Column 22, please change the word "unsealed" to "unscaled"
Claim 2, Line 62, Column 22, please change the word "unsealed" to "unscaled"
Claim 2, Line 63, Column 22, please change the word "unsealed" to "unscaled"
Claim 3, Line 11, Column 23, please change the word "unsealed" to "unscaled"
Claim 3, Line 13, Column 23, please change the word "unsealed" to "unscaled"
Claim 8, Line 18, Column 24, please change the word "unsealed" to "unscaled"
Claim 9, Line 23, Column 24, please change the word "unsealed" to "unscaled"
Claim 10, Line 29, Column 24, please change the word "unsealed" to "unscaled"
Claim 10, Line 31, Column 24, please change the word "unsealed" to "unscaled"
Claim 10, Line 34, Column 24, please change the word "unsealed" to "unscaled"
Claim 10, Line 35, Column 24, please change the word "unsealed" to "unscaled"
Claim 19, Line 12, Column 26, please change the word "unsealed" to "unscaled"
Claim 19, Line 14, Column 26, please change the word "unsealed" to "unscaled"
Claim 19, Line 16, Column 26, please change the word "unsealed" to "unscaled"
Claim 19, Line 17, Column 26, please change the word "unsealed" to "unscaled"
Claim 19, Line 19, Column 26, please change the word "unsealed" to "unscaled"
Claim 19, Line 34, Column 26, please change the word "unsealed" to "unscaled"

Signed and Sealed this
Seventh Day of September, 2021

Drew Hirshfeld
*Performing the Functions and Duties of the
Under Secretary of Commerce for Intellectual Property and
Director of the United States Patent and Trademark Office*